No. 869,198. PATENTED OCT. 22, 1907.
J. F. SANDROCK, J. W. NOBLE & L. O'DELL.
NUT LOCK.
APPLICATION FILED FEB. 18, 1907.
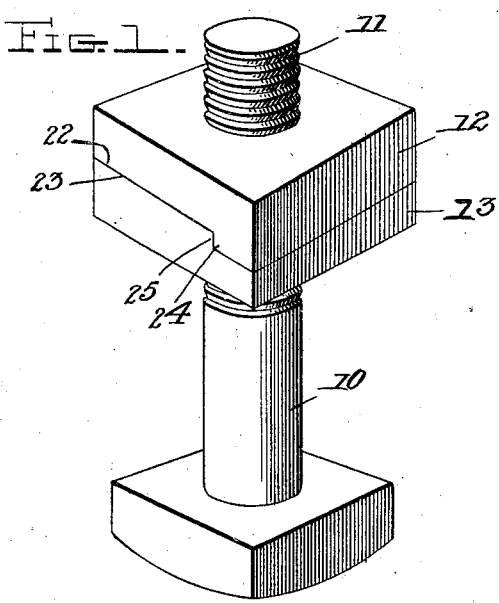
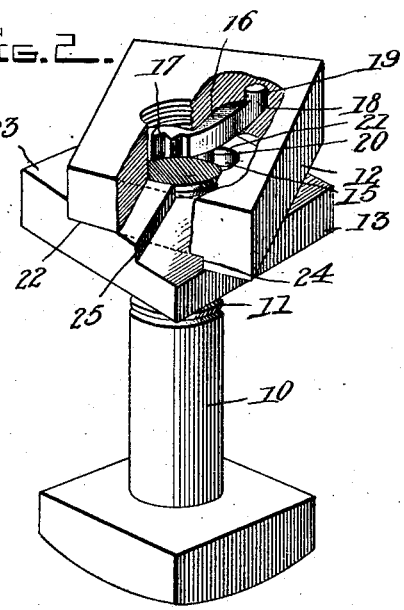
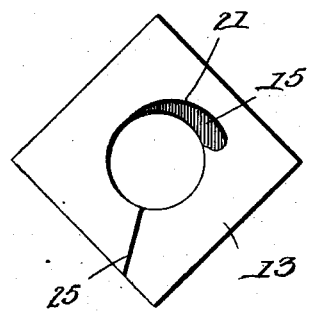
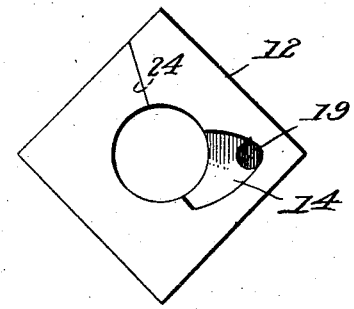
Witnesses
Inventors
Jesse F. Sandrock
Jacob W. Noble
Lee O'Dell
By Milo B. Thomas
Attorneys
THE NORRIS PETERS CO., WASHINGTON, D. C.

UNITED STATES PATENT OFFICE.

JESSE F. SANDROCK, JACOB W. NOBLE, AND LEE O'DELL, OF TYLERSBURG, PENNSYLVANIA; SAID NOBLE ASSIGNOR TO SAID SANDROCK AND SAID O'DELL.

NUT-LOCK.

No. 869,198.       Specification of Letters Patent.      Patented Oct. 22, 1907.

Application filed February 18, 1907. Serial No. 357,875.

*To all whom it may concern:*

Be it known that we, JESSE F. SANDROCK, JACOB W. NOBLE, and LEE O'DELL, citizens of the United States, residing at Tylersburg, in the county of Clarion and State of Pennsylvania, have invented certain new and useful Improvements in Nut-Locks, of which the following is a specification.

This invention is a nut-lock, and more particularly that kind in which the locking action is on the threads of the bolt.

The invention comprises a two-part nut carrying a dog which is movable toward the bolt to grip or bite into the threads thereof. The contiguous surfaces of the nut-sections are reversely inclined by reason of which they will become jammed together in the event of a movement of the outer section to unscrew or back off the bolt.

In the accompanying drawing, Figure 1 is a perspective view showing the parts in unlocked position. Fig. 2 is a perspective view partly in section showing the parts in locked position. Figs. 3 and 4 are plan views of the nut-sections.

Referring specifically to the drawing, 10 denotes a bolt having threads 11. The nut is in two superposed sections indicated at 12 and 13, respectively, both of which are threaded to screw on the threaded portion of the bolt.

The contiguous surfaces of the nut-sections have recesses 14 and 15, respectively, the former being in the section 12 which is the outer one, and the latter recess being in the section 13. Both recesses communicate with the bolt-openings of the respective nut-sections, and the recess 14 contains a dog 16 having teeth 17 to bite into the bolt-threads. The dog is pivotally mounted in the recess 14 being formed on one side with a pivot-stud 18 which fits in a depression 19 in said recess. On the other side of the dog is a projecting pin 20 which extends into the recess 15. This last mentioned recess has a cam-shaped wall 21 which, when it is engaged by the pin 20 causes the dog to swing on its pivot toward the bolt so that the teeth 17 will bite into the threads thereof.

The contiguous surfaces of the nut sections are reversely inclined as indicated at 22 and 23, and are also formed with shoulders 24 and 25, respectively. In the event of a movement of the outer section 12 to unscrew or back off the bolt, these inclined surfaces cause the nut-sections to jam together so that they are prevented from becoming separated endwise. When the shoulders 24 and 25 are in engagement with each other the nut-sections are in proper position with respect to each other to permit their being screwed on or off the bolt.

The nut-sections are screwed on the bolt by placing them together as shown in Fig. 1 with the shoulders 24 and 25 in engagement with each other. In this position the nut-sections can be screwed on the bolt by turning them together. To lock the nut-sections, the outer section 12 is turned in the direction to unscrew which movement causes the pin 20 to ride along the cam-shaped wall 21 whereby the dog will be moved toward the bolt. The unscrewing movement of the section 12 will be continued until the teeth 17 bite into the bolt-threads sufficiently to prevent further movement of said section. In the meantime, by reason of the inclines on their contiguous surfaces, the nut-sections have also been tightly jammed together so that an opposite movement of the outer section (which would withdraw the dog from the bolt-threads) is sufficiently resisted, and the nut-sections will remain securely locked on the bolt.

To unscrew the nut-sections, the outer section is returned to its original position shown in Fig. 1, which movement, by the engagement of the cam-shaped wall 21 with the pin 20, withdraws the dog from the bolt-threads, after which the nut-sections can be unscrewed. However, they must be unscrewed simultaneously, because an independent movement of the outer section in this direction would throw the dog into locking position again.

We claim:—

1. In a nut-lock, a bolt, superposed nut-sections thereon, the contiguous surfaces of said sections having recesses, and one of said recesses communicating with the bolt-hole of the respective section, and the other recess having a cam-shaped wall, and a dog pivotally mounted in the first mentioned recess, and carrying a pin projecting into the other recess, and engageable by its cam-shaped wall for moving the dog into and out of engagement with the bolt.

2. In a nut-lock, a bolt, superposed nut-sections thereon, the contiguous surfaces of said sections having recesses, one of said recesses communicating with the bolt-hole of the respective section and having a depression, and the other recess having a cam-shaped wall, and a dog mounted in the first mentioned recess and having on one side a pivot-stud seating in the depression, and on the opposite side a pin projecting into the other recess, and engageable by its cam-shaped wall for moving the dog into and out of engagement with the bolt.

In testimony whereof we affix our signatures, in presence of two witnesses.

JESSE F. SANDROCK.
                JACOB W. NOBLE.
                LEE O'DELL.

Witnesses:
   M. J. SANDROCK,
   Z. E. KING.